United States Patent
Beardsworth et al.

(10) Patent No.: US 11,853,451 B2
(45) Date of Patent: Dec. 26, 2023

(54) CONTROLLED DATA ACCESS

(71) Applicant: Issured Limited, London (GB)

(72) Inventors: David Beardsworth, London (GB); Jeddiah Stone, London (GB); Jonathan Empson, London (GB)

(73) Assignee: Issured Limited, London (GB)

( * ) Notice: Subject to any disclaimer, the term of this patent is extended or adjusted under 35 U.S.C. 154(b) by 305 days.

(21) Appl. No.: 17/403,606

(22) Filed: Aug. 16, 2021

(65) Prior Publication Data

US 2022/0058289 A1 Feb. 24, 2022

(30) Foreign Application Priority Data

Aug. 19, 2020 (GB) .................................... 2012964

(51) Int. Cl.
| | |
|---|---|
| *G06F 21/62* | (2013.01) |
| *G06F 16/2457* | (2019.01) |
| *G06F 16/248* | (2019.01) |
| *G06F 21/32* | (2013.01) |
| *G06F 21/60* | (2013.01) |
| *G06F 21/10* | (2013.01) |

(52) U.S. Cl.
CPC ........ *G06F 21/6227* (2013.01); *G06F 16/248* (2019.01); *G06F 16/24573* (2019.01); *G06F 21/32* (2013.01); *G06F 21/602* (2013.01); *G06F 21/107* (2023.08)

(58) Field of Classification Search
CPC ........... G06F 21/6227; G06F 16/24573; G06F 16/248; G06F 21/32; G06F 21/602; G06F 21/107
See application file for complete search history.

(56) References Cited

U.S. PATENT DOCUMENTS

| | | | | |
|---|---|---|---|---|
| 2015/0220742 A1* | 8/2015 | Ouyang | ............... | G06F 9/4406 713/189 |
| 2016/0112413 A1* | 4/2016 | Wang | .................. | H04L 63/0846 713/171 |
| 2017/0026350 A1* | 1/2017 | Dawoud | ............... | H04L 63/067 |

FOREIGN PATENT DOCUMENTS

WO  WO-2019020194 A1 * 1/2019 ............. G06F 21/64

OTHER PUBLICATIONS

Search Report for European Application No. 21188902.7 dated Jan. 14, 2022, 9 pages.

(Continued)

*Primary Examiner* — Ayoub Alata

(57) ABSTRACT

A method for providing and searching a searchable encrypted database. The system obtains plain text data and first and second encryption keys. The plain text data is parsed using a priori knowledge of the plain text data structure to identify data blocks and associated metadata components. The data blocks are encrypted using the first encryption key to provide encrypted data blocks. The metadata components are encrypted with the second encryption key to provide encrypted metadata components. The encrypted data blocks and encrypted metadata components are stored in a storage vault to provide a searchable encrypted database whilst discarding the plain text data and the first encryption key. A search term is encrypted with the second encryption key to provide an encrypted search term used to search the searchable encrypted database to determine whether it matches one or more of the encrypted metadata components, and a search result is returned.

15 Claims, 5 Drawing Sheets

(56) References Cited

OTHER PUBLICATIONS

Iftekhar Salam et al., "Implementation of searchable symmetric encryption for privacy-preserving keyword search on cloud storage", Human-centric Computing and Information Sciences, XP055868509, Nov. 2015, vol. 5, No. 19, pp. 1-16, retrieved from: https://eprints.qut.edu.au/100789/1/s13673-015-0039-9.pdf.
Examination Report for Application No. GB 2012964.9, dated Jan. 8, 2021, 6 pages.
Examination Report for Application No. GB 2012964.9, dated May 24, 2021, 4 pages.

* cited by examiner

CONTROLLED DATA ACCESS

CROSS-REFERENCE TO RELATED APPLICATIONS

This application is based upon and claims priority to and benefits of British Patent Application No. 2012964.9, filed on Aug. 19, 2020. The content of the above identified application is incorporated herein by reference in its entirety.

TECHNICAL FIELD

The present invention relates to systems, methods, and apparatus for providing controlled access to data. In particular, it relates to storing encrypted data in a "blinded" database wherein searching the data and accessing the data are controlled using separate unique encryption keys. Blinded is defined as a process where plain text data is encrypted to cipher text without any element of plain text being retained on any removable media or hard drive. The resultant cipher text can only be displayed in its encrypted state and can only be subject of a function in its encrypted state.

BACKGROUND

In recent years, the importance and value of data ownership has become an increasingly mainstream topic. As a result, individuals and organisations are more concerned than ever with data protection, and with who can and should be allowed to access their data. People expect to understand how their personal data is being used, regardless of the legal basis for processing it.

One main source of data can be found in smart phones that are powerful repositories of highly sensitive personal information, including intimate conversations, family photographs, location history, browsing history, biometric, medical, and financial data. They reveal patterns of daily personal and professional lives and enable penetrative insights into our actions, behaviour, beliefs, and state of mind. It is no exaggeration to say that the personal data found in our mobile phones richly depict our lives.

Other electronic devices, such as computers (e.g. desktops, laptops, tablets), memory (e.g. hard drives, pen drives), cameras (e.g. security cameras, dash cams), smart sensors (e.g. smart watches, wearable devices) etc. can store data stored by their users (e.g. files stored on a device by a user), as well as collect and store data about the user(s) and their interactions with the device (e.g. location, calls made, apps used, website visited, etc.). A device user or other relevant data owner may on some occasions have to provide access to some or all of the data on a device. For example, a device may be relevant to a criminal investigation, and access to the device may be required to search for and/or obtain evidence. A third party, such as for example legal authorities, may request or demand access to the device. When such access needs to be provided, privacy concerns relating to data access may arise for the device user/owner. For the third party, it may be important to avoid the data being tampered with so that it can be used as a reliable and trustworthy data source.

Under current circumstances, a third party, such as for example the police, may request the use of a device and hold on to it for a prolonged period of time, while an investigation is ongoing and access to the data may be required. By holding on to a device, tampering such as deletion, amendment, and/or addition of data on the device may be avoided.

However, this means the device user/owner no longer has access to the device. The device be held for anywhere between several hours to multiple years, during which time the device user/owner is unable to use their device. This also requires a third party to provide safe storage of the device for the duration of the request, and denies the user/owner access to their property. These are both undesirable properties of the system.

The long retention period could be addressed by making a copy of the device data and returning the original device to the user/owner. However, this may raise privacy concerns, as the user/owner may not want to hand over access to all device data, while the third party does not know which data is and is not required for its investigation. It is critically important that individuals who have been a victim of or witness to crime do not suffer further distress due to unnecessary intrusion into areas of their life they have a reasonable expectation would be kept private. Individuals must have meaningful choice and control over how their data is used.

Current practices do not always demonstrate the conditions needed for consent to be valid. If opting to rely on consent, the police must ensure that they are meeting these high standards.

The present invention aims to solve at least some of the problems set out above and introduce privacy by design.

SUMMARY

According to a first aspect of the disclosure, there is provided a method and/or system of providing a searchable encrypted database and for searching that database. The method and system comprise obtaining plain text data and first and second encryption keys; parsing the plain text data using a priori knowledge of the plain text data structure to identify a plurality of data blocks and associated metadata components; encrypting the plurality of data blocks using said first encryption key to provide one or more encrypted data blocks; separately encrypting the metadata components with said second encryption key to provide a plurality of encrypted metadata components; storing the encrypted data block(s) and encrypted metadata components in a storage vault to provide a searchable encrypted database whilst discarding the plain text data and said first encryption key; defining a search term; encrypting the search term with said second encryption key to provide an encrypted search term; searching said searchable encrypted database using said encrypted search term to determine whether or not the encrypted search term matches one or more of the encrypted metadata components; and returning a search result.

Optionally the method may comprise, in the event that the returned search result indicates that the encrypted search term matches one or more of the encrypted metadata components, recovering said first encryption key and said encrypted data block(s) associated with the matching encrypted metadata component(s), and using the first encryption key to decrypt the recovered encrypted data blocks.

Optionally, the first encryption key may be obtained using a Biometric ID that is held by a first party for controlling access to the data blocks, and the second encryption key is made available to a third party for enabling searching of the searchable encrypted database.

Optionally, obtaining a first encryption key may comprise obtaining a biometric ID held by a first party. It may further comprise generating the first encryption key based on the biometric ID of the first party, and a base encryption key held by a vault creator party.

Optionally, the method may further comprise determining a hash of whole or part of the searchable encrypted database, and saving a provenance record comprising the hash to a distributed ledger.

Optionally, said distributed ledger may be a blockchain system.

Optionally, determining the hash of whole or part of the searchable encrypted database may comprise: determining a first hash of the encrypted data blocks, determining a second hash of the encrypted metadata components, and determining a third hash of the combination of the encrypted data blocks and the encrypted metadata components.

Optionally, the provenance record may comprise a unique reference number associated with the hash.

Optionally, the method may further comprise determining, in the event that the returned search result indicates that the encrypted search term matches one or more of the encrypted metadata components, a hash of whole or part of the searchable encrypted database, and checking the determined hash against the provenance record saved in the distributed ledger.

Optionally, the method may further comprise determining a hash of the search term and the returned search result, and saving a search provenance record to the distributed ledger.

Optionally, the method may further comprise determining, before decrypting the recovered encrypted data blocks, a hash of the search term and the returned search result, and checking the determined hash against the search provenance record saved in the distributed ledger.

Optionally, said metadata components may include parts of the data blocks.

Optionally, in the event that the returned search result indicates that the encrypted search term matches one or more of the encrypted metadata components, the method may further comprise setting off an alert to indicate the search result has returned a match.

Optionally, the alert may comprise at least one of an audio alert and a visual alert.

Optionally, in the event that the returned search result indicates that the encrypted search term matches one or more of the encrypted metadata components, the method may further comprise sending a notification to a third party that requested the search term.

According to another aspect of the disclosure, there is provided a vault creator apparatus for providing a searchable encrypted database, comprising one or more hardware processors. The one or more hardware processors are configured to receive plain text data and first and second encryption keys; parse the plain text data using a priori knowledge of the plain text data structure to identify a plurality of data blocks and associated metadata components; encrypt the plurality of data blocks using said first encryption key to provide one or more encrypted data blocks; separately encrypt the metadata components with said second encryption key to provide a plurality of encrypted metadata components; store the encrypted data block(s) and encrypted metadata components in a storage vault to provide a searchable database while discarding the plain text data and said first encryption key; receive an encrypted search term encrypted with said second encryption key; search said searchable encrypted database using said encrypted search term to determine whether or not the encrypted search term matches one or more of the encrypted metadata components; and return a search result.

The apparatus may for example comprise one or more hardware servers with one or more hardware processors. The apparatus may comprise or be connected to one or more non-transitory storage mediums (e.g. hardware memory).

BRIEF DESCRIPTION OF THE DRAWINGS

The invention will now be described, by way of example only, in relation to the following drawings, in which.

DETAILED DESCRIPTION

Figure 1:
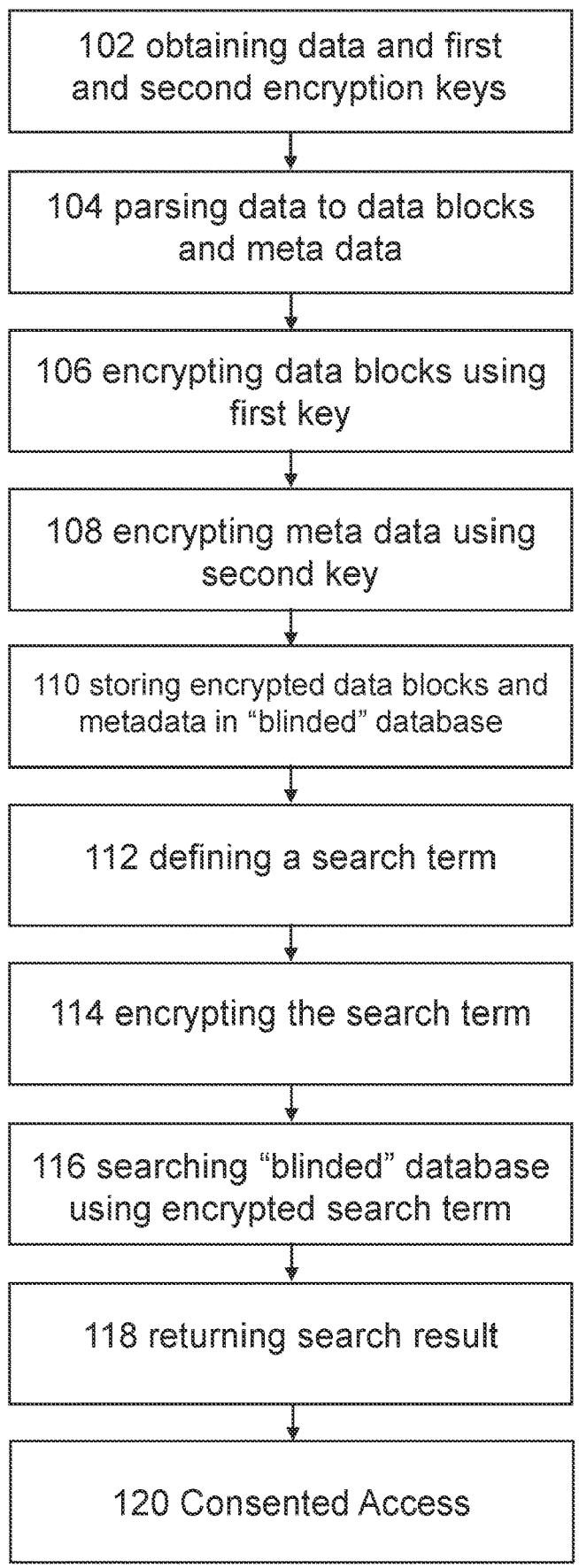
FIG. 1 depicts a flow diagram of a method for providing a searchable encrypted database and for searching that database.

Described herein are systems, methods, and apparatus for providing a searchable encrypted database and for searching that database.

Data stored on a device may be of interest to a third party. However, the owner, or party authorised to grant access to the data may want control over which data is accessed. By "controlled" it is meant that the access to the data can be monitored, and that the person(s) providing the third party with permission to access the data has control over how and when the third party accesses some or all of the data.

In an example application, legal authorities such as the police constabulary or authority, may require access to a device for an investigation, for example because the device user is a suspect, witness, or otherwise related to an investigation. Confiscating the device for the duration of the investigation could result in the device not being returned to a user for several years. Furthermore, during the time the device is confiscated, it needs to be kept in a secure manner, and comply with any relevant legal requirements. Although it is possible to take a copy of data on a device, for example a plain text copy, this may not always be possible. A third party may not be entitled to unlimited access to a device. For example, police force/authorities may want to access data relevant to an investigation (e.g. data connected to a time period, location, and/or individual). However, it may not be apparent at the time of making a copy, which of the present data qualifies as relevant data, meaning a reliable copy of all data may be required. Providing a copy of all data may provide the police with access extending beyond what is relevant to the investigation, and a user may refuse to give permission for the third party to make such a copy. It would therefore be beneficial to provide systems and methods in which a user can control how a third party can access data on a device. It may also be advantageous to keep a record of how the provided data is accessed.

The methods and apparatus described herein may be used to make secure and verified copy/copies of data stored on and/or in relation to a device. Securing the data may be of interest to the party providing and/or owning the data. The data may be secured by storing the data in an encrypted form. This may enable that the stored data is not accessible to any parties who do not have access to the key for decrypting the encrypted data. Storing verified data may be of interest to the party wishing to obtain access to the data at the time the copy of the data is made. This may be because the data may be relevant to an event of interest. The event of interest may for example be related to an investigation, such as a criminal investigation, civil law investigation, or any other type of investigation in which the data may be used as evidence. The copy of the data may be verified for example by storing it in a trusted apparatus (e.g. a storage vault), for example in a trusted apparatus, and/or by a trusted storage party. Control of the trusted location apparatus and/or party may be separate from the first party providing/ owning the data. This may mean that the first party is not able to delete, hide, amend and/or otherwise tamper with the data after the copy is made, for example to hinder the investigation. As a result of the data being verified, it may be suitable for use in an investigation, for example the data may be used as evidence.

FIG. 1 depicts a flow diagram of steps in a method for providing a searchable encrypted database and for searching that database without unencrypting the data. The data is never available in plain text form due to the encryption occurring in run time as the data is extracted and parsed. In step 102, plain text data and first and second encryption keys may be obtained. The plain text data may be obtained from a device relating to a device contained data of interest, for example a device relating to an investigation, for example a criminal investigation. In step 104, the plain text data may be parsed using a priori knowledge of the plain text data structure. The parsing may identify a plurality of data blocks and respective metadata components. In step 106 the plurality of data blocks are encrypted using the first encryption key (comprised of a Biometric Identifier and an AES 256 key to make a new unique encryption key). This may provide one or more encrypted data blocks. In step 108 the metadata components may be encrypted separately from the plurality of data block using the newly defined algorithm. The metadata components are encrypted with the second encryption key to provide a respective plurality of encrypted metadata components in the 'Metadata database'. In step 110, the encrypted data block(s) and the encrypted metadata components may be stored in a digital storage vault.

The storage vault provides a searchable encrypted "blinded" database for searching in its encrypted form. The plain text data and the first encryption key may be discarded for the searching of the encrypted metadata. In step 112 a search term may be defined. In step 114 the search term will be encrypted with the second encryption key (comprised of unique Reference Number ID and AES 256 encryption) to provide an encrypted search term. In step 116 the searchable encrypted 'metadata database' may be searched using the encrypted search term. The search may determine whether or not the encrypted search term matches one or more of the encrypted metadata components. In step 118 the search result may be returned with no plain data. In step 120 the search term may be authorised for data extraction by the data owner using their biometric identifier.

Figure 2:
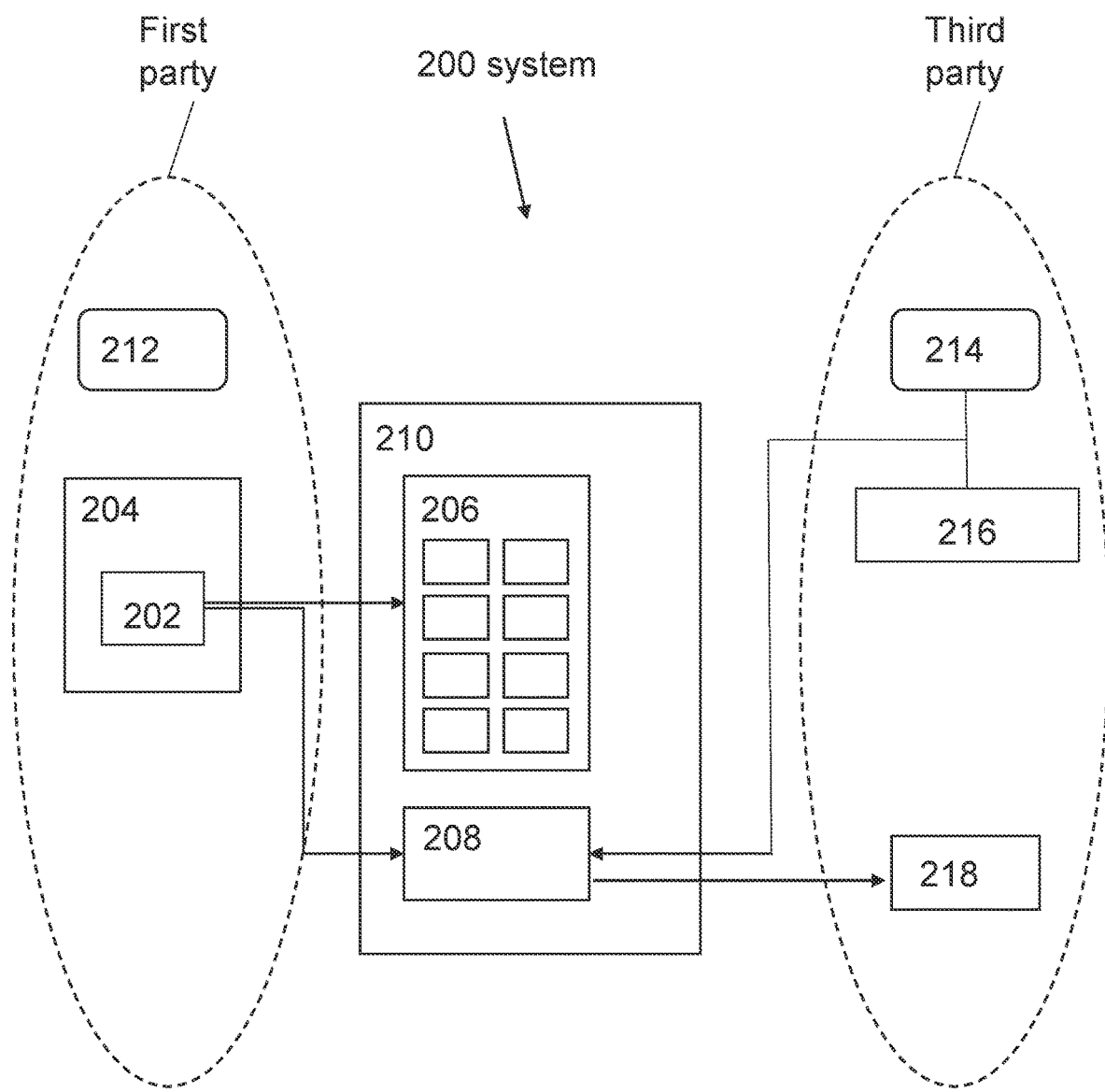
FIG. 2 depicts a schematic representation of a system for providing an encrypted searchable database.

The method above may be performed by a system such as the one depicted in FIG. 2. System 200 may be suitable for providing a searchable encrypted database, and for searching that database in its encrypted form. The system may comprise one or more apparatus (e.g. a (hardware) server). The apparatus may perform the obtaining (step 102), parsing (step 104), and encrypting (steps 106, and 108) steps of the method. Data 202 may be obtained, for example from a device 204. The device may be a device relevant to an investigation. The data may belong to and/or be held by a first party, who may be referred to in this disclosure as the "user" and/or the "owner". The data is encrypted as it is obtained. The data may be obtained from the first party as encrypted data in real time. The plain text data 202 may be encrypted in runtime and parsed into a plurality of data blocks and respective encrypted metadata components. The plurality of data blocks may be encrypted using the first encryption key 212, providing a plurality of encrypted data blocks 206. The metadata components may be encrypted using the second encryption key 214, providing encrypted metadata components 208. The encrypted data blocks 206 and encrypted metadata components 208 may be stored in the digital storage vault 210. Once the data blocks have been encrypted, the plain text data on the owner's device and first encryption key are discarded in the process of creating the searchable encrypted database. The first party maintains its Biometric identified component of the first encryption key 212. The device 204 carrying the data 202 may also be returned to the first party.

The searchable encrypted database may comprise the storage vault comprising the encrypted data blocks 206 and encrypted metadata components 208, and the second encryption key 214. Once the encrypted data blocks 206 and metadata components 208 are stored in storage vault 210, a third party may be provided with the second encryption key 214 to enable the third party to search the searchable encrypted "blinded" database. To search the database, the third party may define a search term 216. The search term may be encrypted using the second encryption key 214. Once encrypted, the search term 216 may be provided to the encrypted "blinded" database. The encrypted "blinded" database is searched to determine whether the encrypted search term 216 matches one or more of the encrypted metadata components 208. The result of the search is returned from the "blinded" database to the third party. The searchable encrypted "blinded" database may be created and stored in a storage vault by a vault creator party. The vault creator party may discard both first and second encryption keys, so that it is neither able to access nor search the "blinded" database, making the searchable encrypted "blinded" database secure against its creator. The storage vault may also be referred to as a "blinded vault". The encrypted data blocks and encrypted metadata components may be referred to as "blinded data" and "blinded metadata" respectively, as the vault creator and/or other unauthorised parties are not able to access, or "see" the content of the vault.

Different steps in the methods set out herein may be performed by the same or different hardware apparatus. In some instances, the apparatus performing the parsing step may be separate from the apparatus performing the encrypting step, or they may be same apparatus. The steps of defining and encrypting a search term may be performed by the same or a separate apparatus to the apparatus performing the parsing and/or encrypting steps. In some implementations, the apparatus defining and encrypting the search term may be the same as the apparatus comprising the storage vault.

The storage vault may be a virtual vault created on a hardware apparatus, for example a server. The storage vault apparatus may be separate from the apparatus performing the other steps in the method. In some implementations, the storage vault may be on the same hardware apparatus as the parsing and/or encrypting apparatus. In the instance where the storage vault is located on a separate apparatus to the one performing parsing and/or encrypting, the two hardware apparatuses may be connected via a wired and/or wireless connection. The connection may be disconnectable. For example, the connection may be configured to disconnect when the database is not being used, e.g. being searched.

The system of FIG. 2 may involve at least three separate parties: a first party associated with the data 202 and device 204, a vault creator party associated with creating and managing the encrypted searchable "blinded" database, and a third party which has been granted access to search the encrypted database. An advantage of the method and system 200 described above is that it may provide a database in which the different parties have different levels of access and control to provide consented access. Specifically, the first party may control access to unencrypted data, the third party may have access to the search function of the database, and the vault creator party may be restricted from accessing both the unencrypted data and the search function, while having created and managing storage of the database. This is achieved by having a database that is encrypted using two separate keys in such a way that both the data content of the database (encrypted data blocks) and the searchable terms (metadata components) are encrypted, so that access is restricted to those parties that have the relevant encryption keys available.

Parsing of the plain text data may require knowledge of the software and/or hardware of device 204. The parsing may for example split the plain text data into blocks corresponding to separate files. For example, a data block may relate to an image file, a video file, a document file, an entry into an address book, etc. Metadata components may be determined from each data block.

Metadata components may comprise parts of the plain text data itself. Metadata components relating to a data block may also comprise for example file name, data of file creation, data of most recent edit, etc.

As part of the determination of the metadata, the vault creator may also perform an analysis of the content of the data block to determine metadata components relating to the content of the file the data block represents. This may enable the creation of a searchable database in which both the file data and the file content may be searchable by the third party.

In a first example, if a data block comprises a text-based file, determining metadata components may comprise identifying words from the text, and saving those words as individual metadata components. Identifying words for metadata components may involve for example separating the text of the file into individual words and making each word a metadata component. Each word saved as a metadata component may be a searchable term (in its encrypted form) in the searchable "blinded" database.

In a second example, if a data block comprises an image or video-based file, determining metadata components may comprise performing image analysis on the data block. This may for example include identifying features such as faces, text, landmarks, etc. The identified features may be isolated and saved as a metadata component. Alternatively or additionally, a textual description of the identified features may be saved as metadata components.

In a third example, if a data block comprises an audio file, determining metadata components may comprise performing language recognition on the audio file to identify keywords. Identified keywords may be saved as a metadata component related to that data block.

The data blocks and metadata components have been encrypted using separate first and second keys, meaning that access to these elements can be provided separately to different parties. The third-party having access to the second encryption key can use the key to encrypt search terms and determine whether the search terms are present in the metadata components. During the search the metadata components remain encrypted. The third party does not obtain access to any data stored in the encrypted "blinded" database, other than receiving results of search terms provided by the third party. The search result does not return information about anything other than the search term provided by the third party itself. Furthermore, the second encryption key is required in order to be able to encrypt search terms to perform a search. This means that a party that does not have access to the second encryption key is not able to perform a meaningful search.

Another advantage of the system 200 is that the first party controls access to data 202 even after a copy of the data is stored in the encrypted "blinded" database. In order to access the encrypted data blocks in the encrypted "blinded" database the first encryption key is needed. This key was discarded by the vault creator apparatus after encryption of the data blocks, so that only the first party to which the data 202/device 204 belonged has a copy of the first encryption key. If the third party requires access to data in the encrypted database, authorisation from the first party is required, as the first party controls access to the "blinded" encrypted data blocks via the first encryption key and Biometric ID.

In the event that the returned search result 218 indicates that the encrypted search term 216 matches one or more of the encrypted metadata components 208, the first encryption key 212 may be recovered on consent. Recovering the first encryption key 212 may for example involve the third-party requesting authorisation to access the "blinded" database 210 from a first party, and the first party granting authorisation by providing the first encryption key 212 to the third party in person as a one off consent request to the data. The encrypted data block(s) 206 associated with the matching encrypted metadata 208 may be recovered from the storage vault 210. The data block(s) 206 may be decrypted using the first encryption key. The decrypted data block(s) associated with the search term may be provided to the third party.

In order to be able to verify some of the activity of the system 200, a record of actions performed in relation to the creation and searching of the searchable encrypted "blinded" database may be created and saved. The record may be a provenance record, that is to say a record that enables verification of actions and content of the "blinded" database. For example, a provenance record may be used to verify that the content of the storage vault 210 has not been tampered with compared to the time at which the provenance record was made. It also provides confirmation, if challenged, that only the search terms were used and the data returned was only associated with the requested search terms. It provides provenance for the investigator and the judiciary that the content received is what was searched; it provides the owner with confirmation that only the data associated with the search terms was removed; it provides a receipt for the transaction that can be provided to the owner and third parties if required.

A provenance record may comprise a representation of the whole or part of the encrypted searchable database contained in the storage vault 210. In order to protect content of the storage vault 210 from being accessible outside the vault 210, instead of saving a record of the content of the vault itself, the system 200 may determine a hash of the content, and the hash may be stored in a record. The record may be stored in a blockchain distributed ledger. A blockchain distributed ledger may also be referred to as a blockchain.

Each encrypted data block stored in the storage vault 210 may have a unique reference number (URN). The unique reference number may be a pointer to the encrypted data block. Each data block may be hashed separately. A separate provenance record may be created for each data block, comprising the hash of the encrypted data block and the associated URN.

Once created the provenance record may be saved to the blockchain. The blockchain may create a certificate comprising the provenance record. The blockchain may also create a blockchain ID for the saved provenance record. The blockchain ID may be provided to the storage vault 210, for storing alongside the encrypted data block and URN with which the blockchain ID is associated.

The provenance records may be searched by a validator. The validator may be one of the first party, third party, or vault creator, or may be a separate validator party. To search a provenance record, the validator may retrieve the associated blockchain ID from the storage vault 210. The blockchain ID may be presented to the blockchain ledger. If the blockchain ID matches that of one of the stored certificates, the blockchain may retrieve and return the stored hash value of the encrypted data block and associated URN. The content of the hash value may be checked against the content to be validated. For this, the validator may determine a new hash, using the same hash function, of the encrypted data block, and checks the new hash against the hash saved in the provenance record. If they match, then the encrypted data block has not been altered. If they do not match, then this is an indication that the encrypted data block has been tampered with.

Checking the provenance records may be performed by a validator. The validator may be one of the first party, third party, and/or vault creator party. The validator may alternatively or additionally be a separate party, for example associated with the judiciary or investigator.

Figure 3:
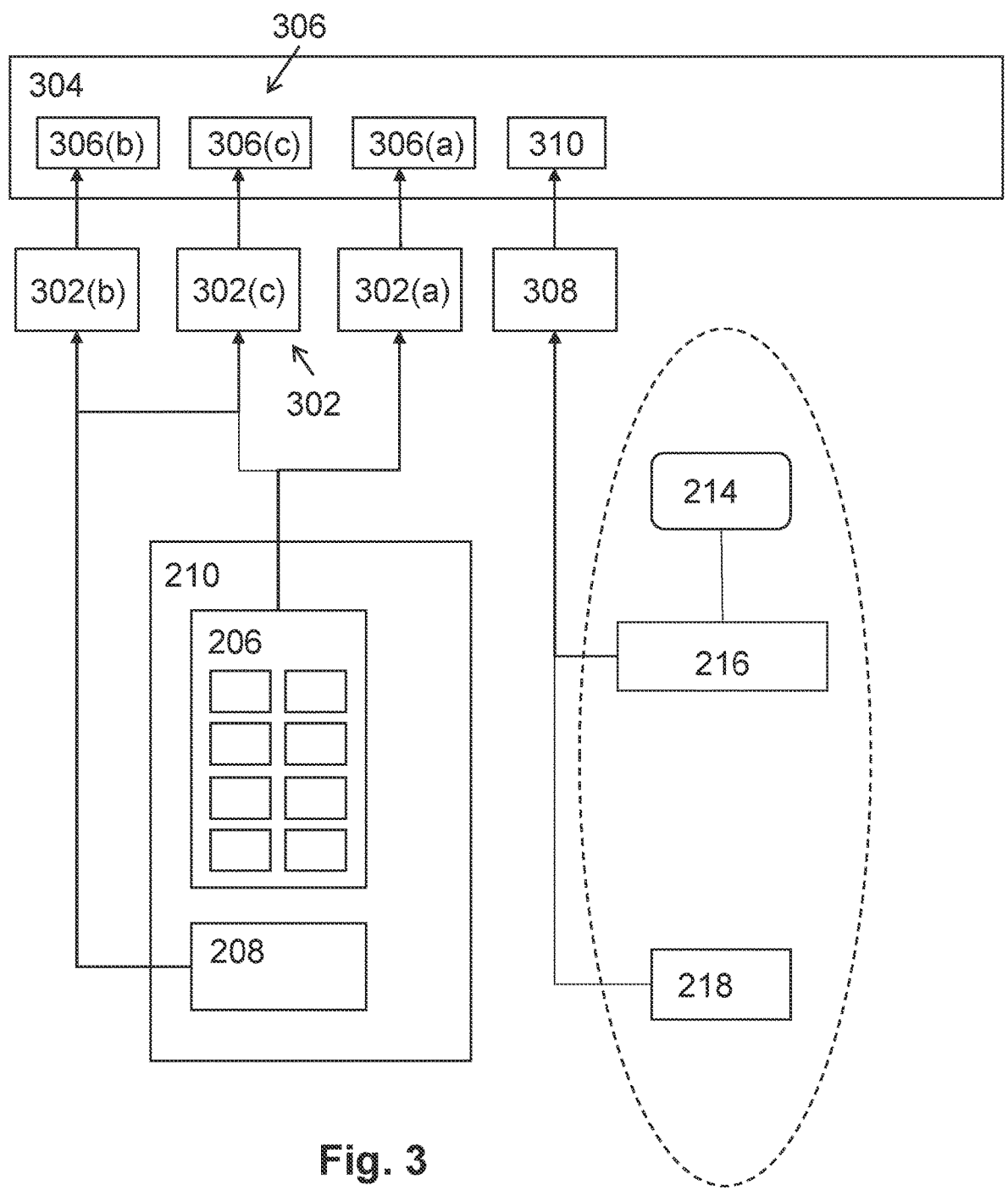
FIG. 3 depicts a schematic representation of a part of the system for creating and storing provenance records.

FIG. 3 depicts a portion of system 200 in relation to creating a provenance record. A hash 302 is determined of database content in storage vault 210. As shown in the Figure, a first set of one or more hashes 302(a) may be determined over the encrypted data blocks 206. A second set of one or more hashes 302(b) may be determined over the encrypted metadata components 208. A third set of one or more hashes may be determined over a combination of the encrypted data blocks 206 and the encrypted metadata components 208. A hash may be determined over a plurality of encrypted data blocks. Alternatively, a separate hash may be determined for each encrypted data block. The hashed data may be saved as a provenance record 306 to a blockchain distributed ledger 304. Specifically, provenance records 306(a), 306(b), and 306(c) of the first, second, and third hashes may be saved to the distributed ledger 304.

As well as a provenance record of whole or part of the database, encrypted search terms and/or returned search results may also be saved in a log. This may for example be done to maintain records of performed searches and/or returned search results. The provenance records, which may also be referred to as search provenance records, may for example be used to verify that a search related to a first party being asked for authorisation to access the encrypted data blocks. FIG. 3 further depicts taking a hash 308 of an encrypted search term 216 and a returned search result 218, and storing a search provenance record 310 of the hash 308 to distributed ledger. The encrypted search term 216 and search result 218 may have a unique reference number associated with them. A hash may be created and saved to the ledger 304 for some or all of the searches performed by the third party. The associated URN may be saved alongside the ledger entry as part of the provenance record.

The provenance record may be created by the vault creator party. The function used to create a hash 302 of all or part of the encrypted database may be the same as the function used to create a hash 308 of a search. In other implementations, different functions may be used to obtain hash 302 and hash 308. The provenance record(s) 306 may be created at the time the encrypted data blocks and encrypted metadata components are added to the storage vault, so that the provenance record is a representation of the data at the time of its creation and addition to storage vault 210. Provenance record 310 may be created at the time the result 218 is returned for encrypted search term 216.

The functions used to create a hash may be available to the validator for checking a provenance record. For example, to verify that an encrypted data block from the database has not been tampered with since it has been created, the validator may retrieve the encrypted data block, and use the hash function to create a corresponding hash of the encrypted data block at the later time. The validator may also retrieve the blockchain ledger ID for the encrypted data block, and use it to retrieve the provenance record 306 from the blockchain ledger 304. The validator may then check the newly created hash against the hash 302 in the provenance record 306.

The provenance record 306 may be made tamper-proof by storing it in a distributed ledger 304. The combination of the use of the distributed ledger 304 for storing the provenance record 306, and the use of the hash for verifying the content of the database at different times, may provide the advantage of making the system for verifying the hashed content. The above also applies for the search provenance record 310.

Figure 4:
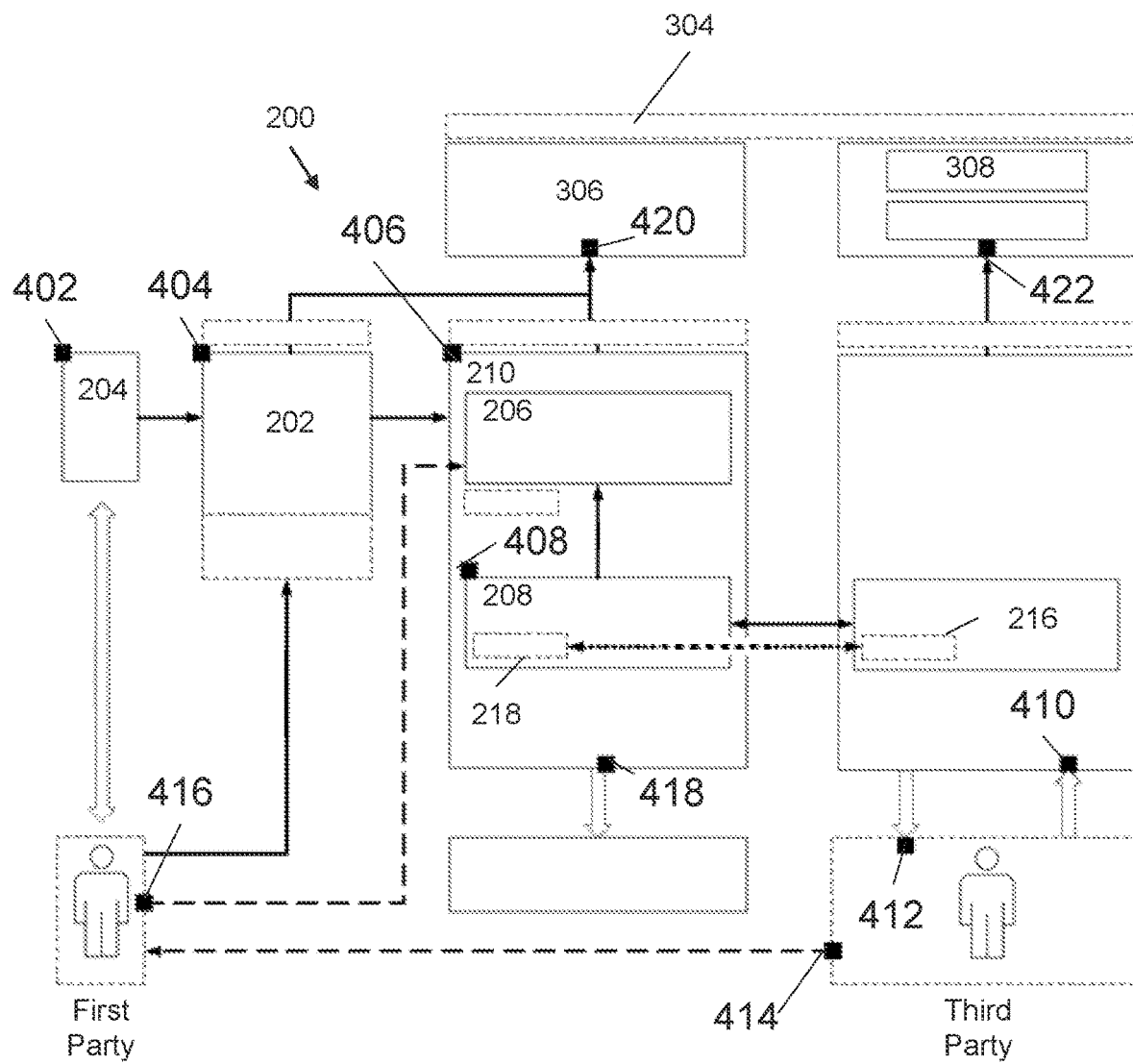
FIG. 4 depicts a schematic representation of the steps in an exemplary system for creating, searching, and accessing a searchable encrypted database.

FIG. 4 depicts an example implementation of a system 200 for providing a searchable encrypted "blinded" database and for searching that "blinded" database. In 402 a user device 204 from a first party may be provided to a vault creator party, so that an encrypted copy of some or all the data 202 on the device 204 can be made for storing in an encrypted "blinded" database. The first party may authorise the making of the copy by the vault creator by providing access to the data 202 on device 204.

In 404 the vault creator may use a unique encryption algorithm to create the first encryption key. The first encryption key is based on the Biometric ID and base encryption key provided by the first party to access the device 204. The key provided by the first party to access device 204 includes the biometric ID (e.g. fingerprint data, facial scan data, etc.). The first encryption key is made up of the biometric key and a base encryption key. The base encryption key may for example be an AES 256 key. This may generate a unique first encryption key which requires the first owner's biometric ID to encrypt and de-encrypt any data. By discarding the first encryption key after creation of the encrypted database, whilst maintaining the base encryption key, the first encryption key can only be recreated when the first party provides its biometric ID.

In 406 the first encryption key may be used to encrypt data 202. The data 202 may not be plain text data and is encrypted. Alternatively, the vault creator may convert the data 202 into plain text data after consent from the first party and the Biometric ID is provided. The vault creator may use a priori knowledge of the user device 204 to separate the plain text data into encrypted data blocks in real time using the first encryption key. The a priori knowledge may for example include knowledge of the hardware of the user device 204 and/or knowledge of the software of the user device (e.g. operating system). Separating the plain text data into data blocks may comprise taking the existing folder and data structure present in data 202, separating the structure into individual files, wherein each file may form a data block. Metadata components may be determined for the data block, as described in step 408, where metadata components may be, for example, data describing the data block or components of the data block itself. The data block may then be encrypted to form the encrypted data block to be stored in storage vault 210.

The data blocks may be encrypted using the first encryption key to obtain encrypted data blocks. Each data block may be encrypted separately. Examples of data blocks may be an image file, a video file, a text file, an audio file, etc. Alternatively or additionally, the collection of data blocks may be encrypted as a whole. A hash of the encrypted data blocks 206 may be created at the same time as creating the encrypted data blocks. The hash may comprise a database unique reference number URN. A provenance record 306 of the hash and optionally the URN may be stored in a blockchain 304, wherein the record may represent the content of the encrypted data blocks at the time the encrypted data blocks were created. This provenance record may be used for verification purposes.

In step 408 the digital vault creator may determine the encrypted metadata components of the data 202 of the device. Step 408 may be performed wholly or partially in parallel with step 406, or may be performed after step 406 has been completed. The vault creator may use a priori knowledge of the device 204 and/or analysis of the content of the data blocks for determining the metadata components. The priori knowledge may include the file and folder structure of data 202. The metadata components may be encrypted using a second encryption key. The second encryption key may be made up of a standard encryption key and a third party encryption key provided by a third party (URN ID). This may create a unique encryption key for creating encrypted metadata components 208. The second encryption key is unique to the third party. The vault creator may discard the second encryption key after finalising encryption of the metadata components 208. The encrypted metadata components may be hashed and a provenance record 306 may be written to the blockchain 304 in step 420. The metadata components 208 may be provided with a unique reference number URN, which may be saved to the blockchain 304 alongside the hash.

The storage vault 210 may store the encrypted data blocks 206 and metadata components 208. The storage vault may also store a cross reference linking the metadata components 208 to the encrypted data blocks 206 they are associated with. The cross reference may also be based on the a priori knowledge used by the vault creator.

Once the storage vault 210 has been populated with the encrypted data blocks 206 and metadata components 208, a third party that has access to the second encryption key and may perform a search in step 410. The third party may perform the search by encrypting a search term using the second encryption key, and sending the encrypted search term 216 to the vault search tool comprising the encrypted metadata components 208. The encrypted search term 216 may be used to search whether it matches one or more encrypted metadata components 208. No decryption is required to perform the search. A search result 218 is returned to the third party. The search result 218 may indicate whether a match is found for encrypted search term 216. The storage vault 210 may comprise information linking an encrypted metadata component 208 to one or more encrypted data blocks 206. Therefore, if an encrypted search returns 218 a positive match for one or more encrypted metadata components 208, this may identify one or more matching encrypted data blocks 206. However, the search is not performed on the encrypted data blocks 206, and no encrypted data blocks are returned as part of the search result.

The encrypted search term 216 and returned search result 218 may be hashed and a search provenance record 208 may be written to the distributed ledger 304 in step 422. This may create a unique immutable provenance record of the conducted search and returned results which allows the search results to be verified. For example, once a search result is returned to the third party in step 412, if a match has been returned, the third party may decide to request access to the database, to retrieve unencrypted data. In order to decrypt encrypted data 206, the first encrypted key is required with first consent. To obtain the first encryption key, the third party may contact, in step 414, the first party to request consented access to the data. As part of the request for access to data 202, the third party may provide the first party with the search provenance record 308 to confirm that the search result 218 provided a match for the data 206 to which access is requested.

If the first party is satisfied that access should be provided, in step 416, the first party may provide its Biometirc ID so that the first encryption key can be recreated. The key may be provided in person or remotely. The request for access provided to the storage vault 210 may comprise an indication of the data blocks 206 that are linked to the encrypted metadata components 208 that provided a match to the search term, so that only the relevant data blocks 206 are decrypted.

As part of the decryption process, the storage vault 210 may check the access request to data blocks 206 against the search provenance record 308. Additionally, or alternatively, the storage vault 210 may also hash the encrypted data blocks 206 to which access is requested, and check the hash against the provenance record 306 stored in the distributed ledger. This may be done to verify that the content of the encrypted data blocks 206 has not been altered since they were first stored in the vault 210 and a record 306 stored to the distributed ledger 304. If the performed checks against the provenance record 306 and/or the search provenance record 308 are validated, the storage vault 210 may decrypt the relevant encrypted data blocks 206. The decrypted plain text data blocks 206 may be provided as output for the third party at step 418.

Described above are methods and systems for creating a searchable encrypted database of data 202 obtained from a first party without unencrypting the data . The data 202 may have an encrypted copy from a device 204. The data may belong to a first party, who may be referred to as a device user.

Described herein, the data 202 and/or device 204 are described as belonging to a first party being a data 202 owner and/or user of the device 204. However, it should be understood that the disclosure is not limited to users of a device 204 or data 202 owners, but may cover any relevant person or organisation associated with a device or data present on it. In particular it may cover persons/organisations having authority to grant access to the device or data to a third party. This may for example be a person owning data stored on a device.

Device 204 may be a user device, such as for example a desktop, laptop, tablet, smartphone, or camera. Device 204 may also be or comprise a memory, such as for example a hard drive, flash memory, cloud storage, etc. Any other type of storage medium on which user data can be stored may also be provided as a device 204 from which data 202 is obtained. The data 202 may be obtained from one or multiple devices 204. The data 202 to be obtained may for example have been stored in a distributed way.

The first encryption key, also referred to simply as the first key, may be a key owned or otherwise accessible by the first party. Alternatively, the first party may hold an associated key from which the first encryption key may be derived. For example, the associated key may be a key to unlock the device on which the data is stored. The first encryption key may be obtained by combining the associated key and a base encryption key, such as, for example AES 256. The associated key may be a biometric ID. The first encryption key may be a blind biometric key. The third party is not provided with access to the first encryption key under normal operation of the system.

In step 104, the plain text data that is encrypted as it is parsed. The parsing may be based on a priori knowledge of the device. For example, the vault creator may have access to a database of knowledge about software and/or hardware of the device 204 to gain knowledge of the structure of the data 202 obtained from a device 204 in plaint text form. As part of the parsing process, metadata components may be derived from the plain text data using the a priori knowledge. The metadata components may comprise data that may correspond to search terms for searching the database.

Although the system is described above as involving three parties, namely a first party, a vault creator party, and a third party, it is also possible for the third party to take on the role of vault creator party as well. This may be because the first encryption key may be discarded after storing the encrypted data blocks in the storage vault. As a result, neither the vault creator party nor the third party has the ability to decrypt the encrypted data blocks 206. The first party may maintain a copy of the first encryption key or a key that allows the first encryption key to be recreated. This means the first party can control and provide consented access to the data blocks in the storage vault through their ability to decrypt the data blocks.

The second encryption key may be unique to the third party.

Figure 5:
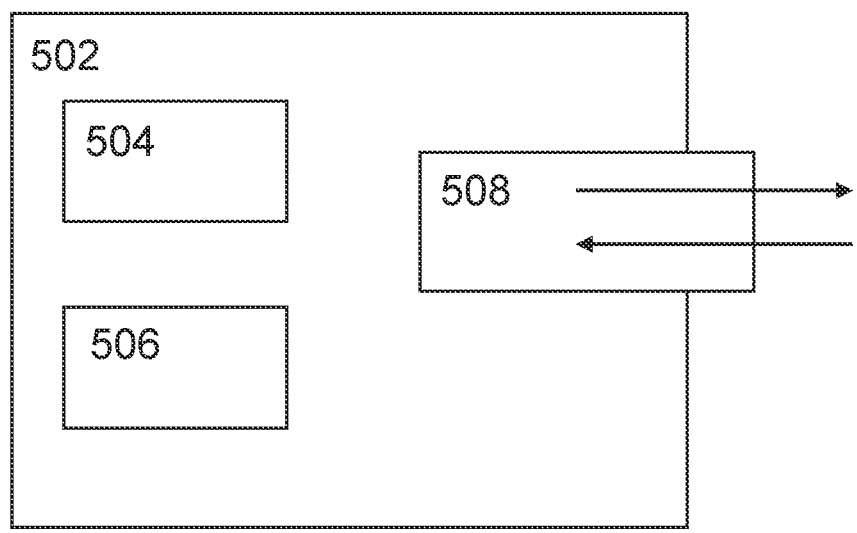
FIG. 5 depicts a schematic representation of a computing device comprising a hardware processor and a hardware memory.

Apparatus described herein, such as a vault creator apparatus, a storage vault, a device, or any other apparatus contributing to the methods and systems described herein may be a computing device comprising at least one hardware processor. The computing device may further comprise a non-transitory storage medium, such as a hardware memory. FIG. 5 depicts an example computing device 502, comprising at least one hardware processor 504, and at least one non-transitory memory 504. The computing device may further comprise any other known features of computing devices. Specifically, the computing device 502 may have connectivity 508 enabling it to connect to and/or communicate with other devices.

While the computing device 502 comprises its own hardware processor(s) 504 and hardware memory 506, the computing device may further also be connected to one or more remote processors and/or memories. These may for example be cloud-based services, and/or remote devices connected to the computing device 502.

The invention claimed is:

1. A method of providing a searchable encrypted database and for searching the searchable encrypted database comprising:
   obtaining plain text data from a first party and obtaining a first encryption key and a second encryption key;
   parsing the plain text data using a priori knowledge of a plain text data structure to identify a plurality of data blocks and associated metadata components;
   encrypting the plurality of data blocks using the first encryption key to provide one or more encrypted data blocks;
   separately encrypting the metadata components with the second encryption key to provide a plurality of encrypted metadata components;
   providing the second encryption key to a third party for enabling the third party to search the searchable encrypted database, wherein the third party does not have access to the first encryption key;
   storing the one or more encrypted data blocks and the encrypted metadata components in a storage vault to provide the searchable encrypted database whilst discarding the plain text data and the first encryption key;
   defining, by the third party, a search term;
   encrypting the search term with the second encryption key to provide an encrypted search term;
   searching the searchable encrypted database using the encrypted search term to determine whether or not the encrypted search term matches one or more of the encrypted metadata components; and
   returning a search result.

2. The method according to claim 1 further comprising, in the event that the returned search result indicates that the encrypted search term matches one or more of the encrypted metadata components, recovering the first encryption key and one or more encrypted data blocks associated with the matching one or more of the encrypted metadata components, and using the first encryption key to decrypt the recovered one or more encrypted data blocks.

3. The method according to claim 1, wherein the first encryption key is obtained using a biometric ID that is held by the first party for controlling access to the plurality of data blocks.

4. The method according to claim 3, wherein obtaining the first encryption key comprises:
   obtaining the biometric ID held by the first party; and
   generating the first encryption key based on the biometric ID of the first party, and a base encryption key held by a vault creator party.

5. The method according to claim 1, further comprising:
   determining a hash of whole or part of the searchable encrypted database; and
   saving a provenance record comprising the hash to a distributed ledger.

6. The method according to claim 5, wherein the distributed ledger is a blockchain system.

7. The method according to claim 5, wherein determining the hash of whole or part of the searchable encrypted database comprises:
   determining a first hash of the one or more encrypted data blocks;
   determining a second hash of the encrypted metadata components;
   determining a third hash of the combination of the one or more encrypted data blocks and the encrypted metadata components.

8. The method according to claim 5, wherein the provenance record comprises a unique reference number associated with the hash.

9. The method according to claim 5, further comprising:
   determining, in the event that the returned search result indicates that the encrypted search term matches one or more of the encrypted metadata components, a further hash of whole or part of the searchable encrypted database, and checking the determined further hash against the provenance record saved in the distributed ledger.

10. The method according to claim 5, further comprising: determining a hash of the search term and the returned search result, and saving a search provenance record to the distributed ledger.

11. The method according to claim further comprising, in the event that the returned search result indicates that the encrypted search term matches one or more of the encrypted metadata components:
   recovering the first encryption key and one or more encrypted data blocks associated with the matching one or more of the encrypted metadata components;
   determining, before decrypting the recovered one or more encrypted data blocks, a further hash of the search term and the returned search result, and checking the determined further hash against the search provenance record saved in the distributed ledger; and
   using the first encryption key to decrypt the recovered one or more encrypted data blocks.

12. The method according to claim 1, wherein the metadata components include parts of the plurality of data blocks.

13. The method according to claim 1, wherein in the event that the returned search result indicates that the encrypted search term matches one or more of the encrypted metadata components, the method further comprises:
   setting off an alert to indicate the search result has returned a match.

14. The method according to claim 1, wherein in the event that the returned search result indicates that the encrypted search term matches one or more of the encrypted metadata components, the method further comprises:
   sending a notification to a third party that requested the search term.

15. A vault creator apparatus for providing a searchable encrypted database, comprising one or more hardware processors and a non-transitory storage medium comprising instructions that when executed by the one or more hardware processors, cause the one or more hardware processors to:
   receive plain text data from a first party, and receive a first encryption key and a second encryption key;
   parse the plain text data using a priori knowledge of a plain text data structure to identify a plurality of data blocks and associated metadata components;
   encrypt the plurality of data blocks using the first encryption key to provide one or more encrypted data blocks;
   separately encrypt the metadata components with the second encryption key to provide a plurality of encrypted metadata components, wherein the second encryption key is made available to a third party for enabling the third party to search the searchable encrypted database, and wherein the third party does not have access to the first encryption key;
   store the one or more encrypted data blocks and the encrypted metadata components in a storage vault to provide a searchable database while discarding the plain text data and the first encryption key;
   receive, from the third party, an encrypted search term encrypted with the second encryption key;
   search the searchable encrypted database using the encrypted search term to determine whether or not the encrypted search term matches one or more of the encrypted metadata components; and
   return a search result.

* * * * *

UNITED STATES PATENT AND TRADEMARK OFFICE
CERTIFICATE OF CORRECTION

| | |
|---|---|
| PATENT NO. | : 11,853,451 B2 |
| APPLICATION NO. | : 17/403606 |
| DATED | : December 26, 2023 |
| INVENTOR(S) | : David Beardsworth, Jeddiah Stone and Jonathan Empson |

It is certified that error appears in the above-identified patent and that said Letters Patent is hereby corrected as shown below:

In the Claims

Claim 11, Column 15, Line 9, that reads "The method according to claim further" should read - The method according to claim 10, further -

Signed and Sealed this
Twenty-seventh Day of February, 2024

Katherine Kelly Vidal
*Director of the United States Patent and Trademark Office*